United States Patent Office 3,078,024
Patented Feb. 19, 1963

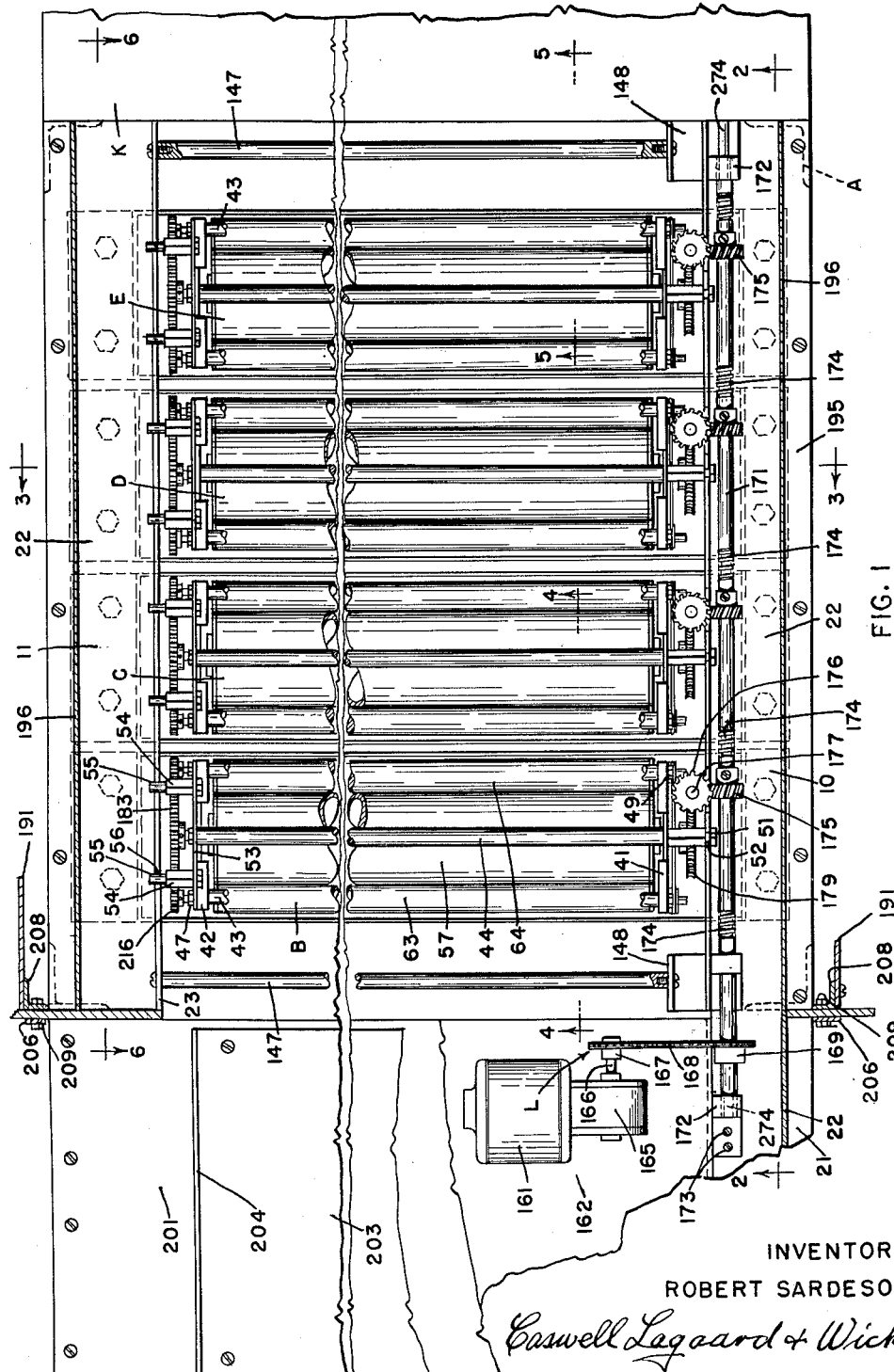

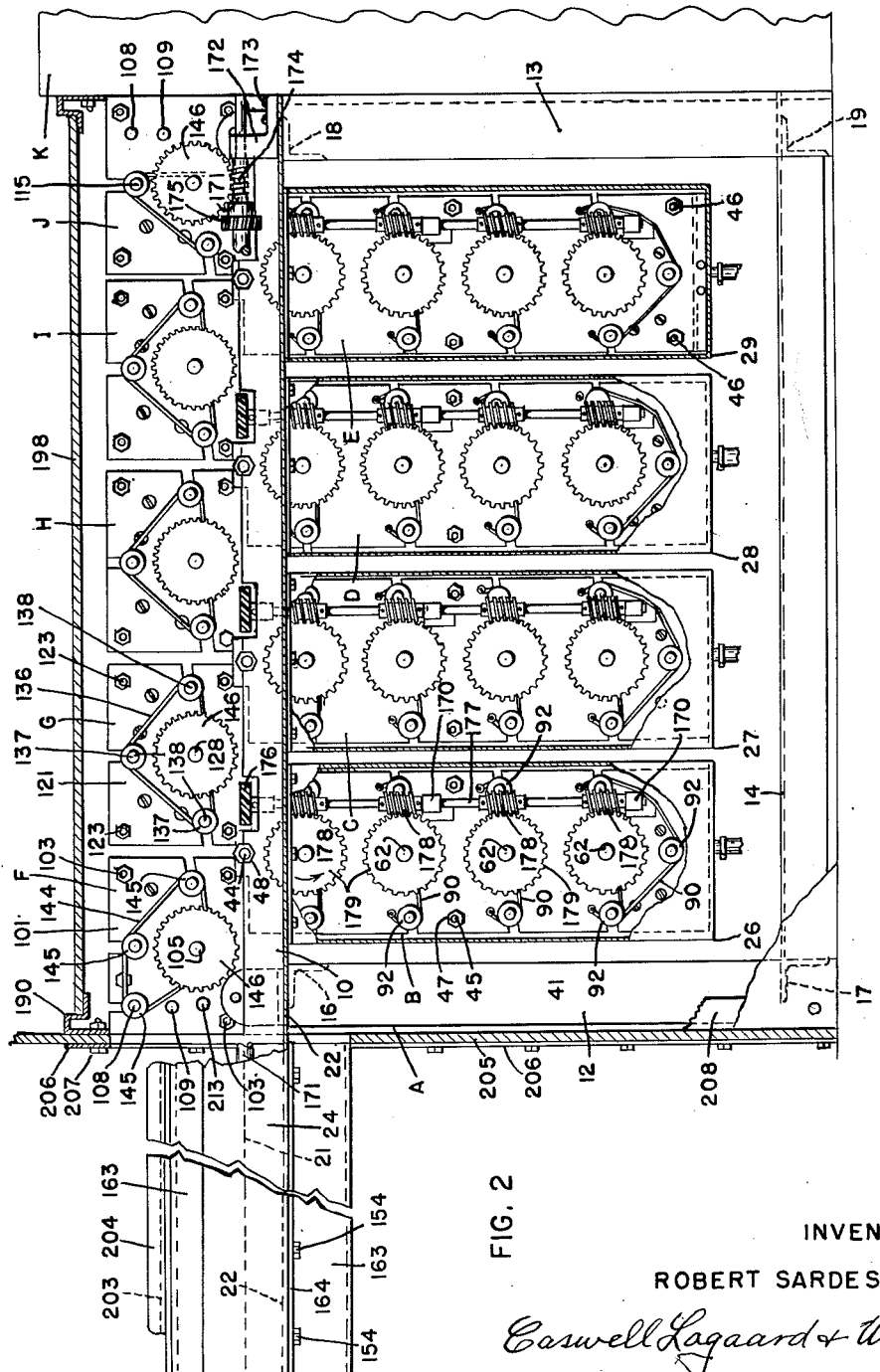

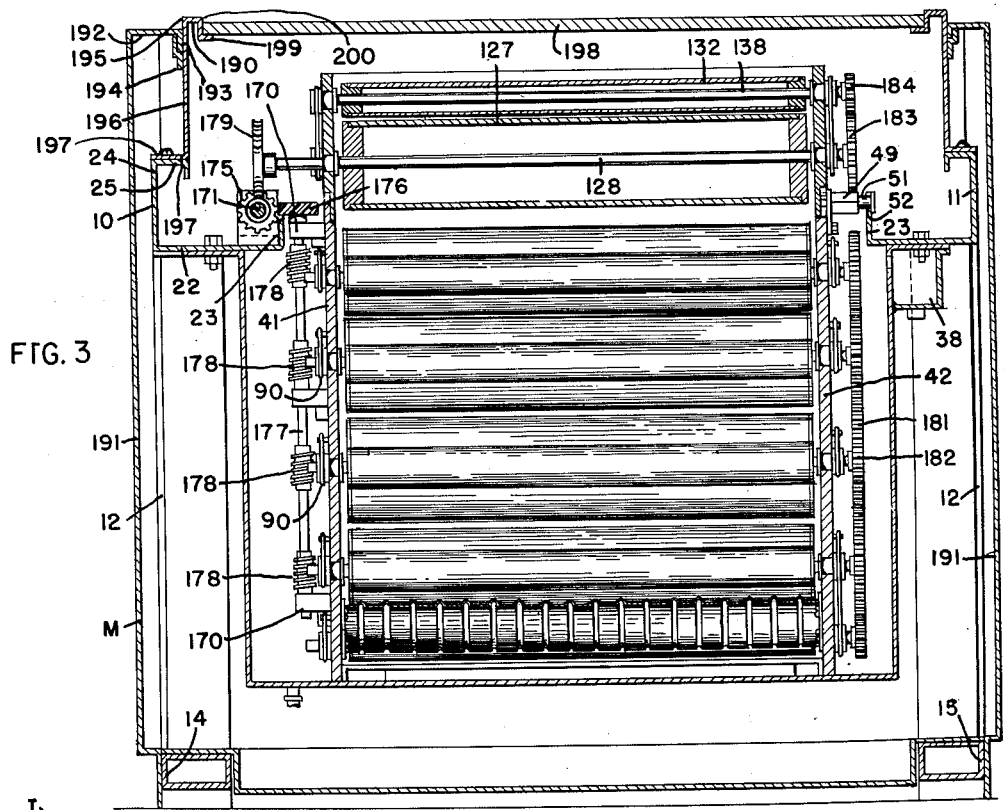
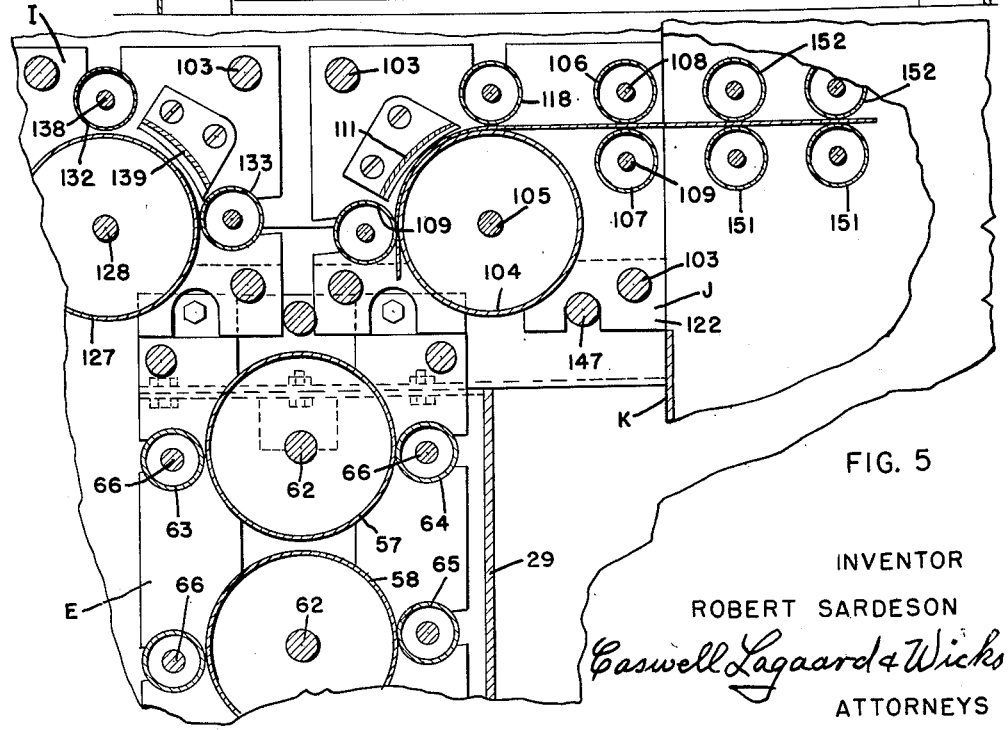

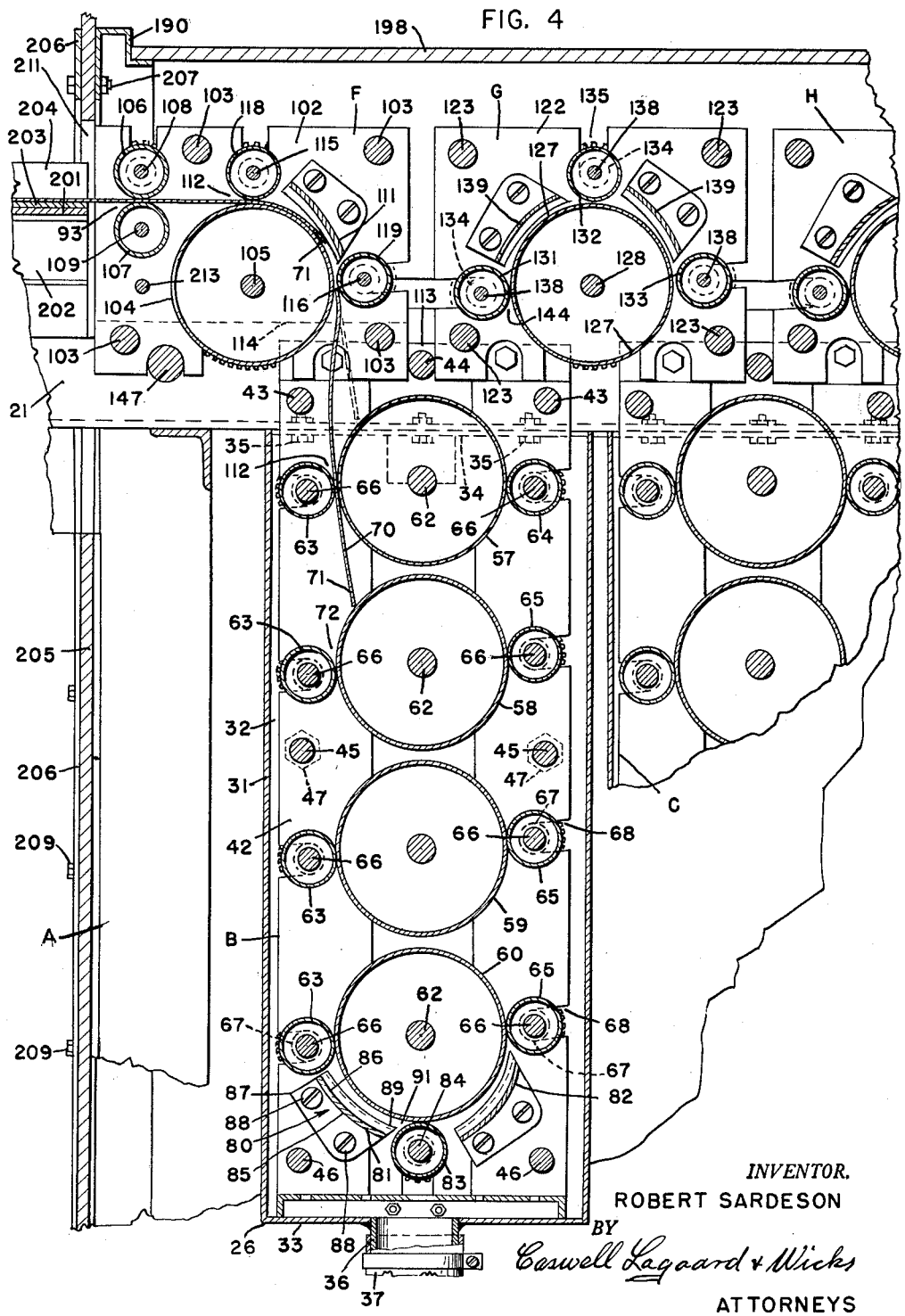

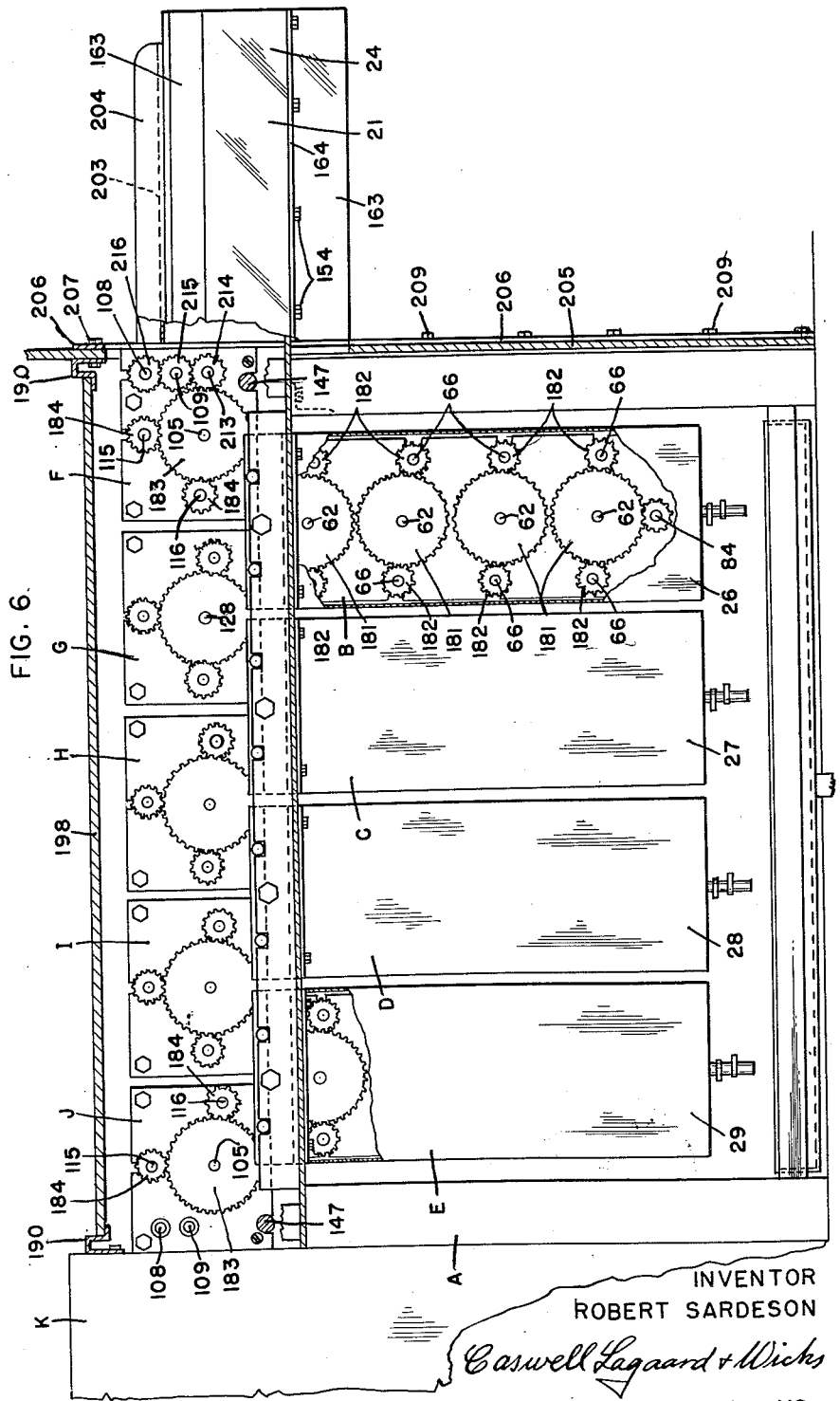

3,078,024
PROCESSING APPARATUS FOR PROCESSING FLEXIBLE SHEET MATERIAL REQUIRING CHEMICAL TREATMENT
Robert Sardeson, Mound, Minn., assignor to Pako Corporation, Minneapolis, Minn., a corporation of Delaware
Filed May 11, 1960, Ser. No. 28,386
8 Claims. (Cl. 226—119)

The herein disclosed invention relates to processing apparatus for processing flexible sheet material requiring chemical treatment and, particularly, for developing cut film and to apparatus in which a vertical tank is employed having a series of spaced parallel feed rolls disposed within said tank, one above the other, together with smaller contact rolls parallel with said feed rolls and urging the film against the feed rolls.

An object of the invention resides in providing means for positively feeding the material from one feed roll to the next without engaging the sheet in its passage between feed rolls.

Another object of the invention resides in arranging the contact rolls with reference to the feed rolls in a manner such that the sheet is canted toward the following feed roll and away from the companion contact roll.

A still further object of the invention resides in arranging the axes of the feed roll and contact roll in parallel relation, with the axis of the contact roll disposed in advance of the axis of the feed roll.

An object of the invention resides in arranging the feed rolls with their axes in a substantially vertical plane, with the axes of the contact rolls below the axis of the feed rolls.

Another object of the invention resides in providing a reversing device at the lowermost feed roll causing the material traveling downwardly from feed roll to feed roll on one side thereof to travel upwardly on the opposite sides of the feed rolls and to provide other contact rolls on the sides of the feed rolls opposite the first named feed rolls and to position said last named contact rolls with their axes above the axes of the feed rolls.

Other objects of the invention reside in the novel combination and arrangement of parts hereinafter illustrated and/or described.

In the drawings:

FIG. 1 is a plan view of apparatus for developing cut film with the transfer, feed and delivery units removed and illustrating an embodiment of the invention.

FIG. 2 is a longitudinal elevational sectional view of the apparatus shown in FIG. 1 with the transfer, feed and delivery units in place and taken on line 2—2 of FIG. 1.

FIG. 3 is a transverse elevational sectional view taken on line 3—3 of FIG. 1.

FIG. 4 is a fragmentary elevational sectional view taken on line 4—4 of FIG. 1, with the transfer, feed and delivery units in place and drawn to a greater scale.

FIG. 5 is a fragmentary elevational sectional view taken on line 5—5 of FIG. 1, with transfer, feed and delivery units in place and drawn to the same scale as FIG. 3.

FIG. 6 is a longitudinal elevational sectional view of the apparatus with the transfer, feed and delivery units in place and taken on line 6—6 of FIG. 1.

The invention comprises a frame A on which is mounted four tanks, 26, 27, 28 and 29, having four processing units, B, C, D, and E removably disposed therein. A feed unit F feeds the film to the first processing unit B and transfer units G, H, and I transfer the film from one processing unit to the following unit and a delivery unit, J, delivers the wet, processed film to a drier, K. A transmission L, drives the various components of the units.

The frame A comprises two upper longitudinal frame members 10 and 11, which are supported on front and rear posts 12 and 13. Extending between the posts 12 and 13 on each side of the frame are lower longitudinal frame members 14 and 15. Upper and lower cross-frame members 16 and 17 extend between the posts 12 and upper and lower cross-frame members 18 and 19 extend between the posts 13. The longitudinal frame members 10 and 11 rest upon the posts 12 and 13 and have forwardly disposed extensions 21. The frame members 10 and 11 are specially constructed, as shown in FIG. 3, being each formed with a web 22, inner and outer upstanding flanges 23 and 24 and a lip 25 turned inwardly from the outer flange 24. The other frame members may be tubular or angular in cross-section, or of any other desired shape, and all of the frame members are secured together by welding or other suitable construction.

All of the processing units B, C, D and E and, likewise, the tanks 26, 27, 28 and 29, are identical in construction and only the unit B and tank 26 will be described in detail.

The tank 26, best shown in FIG. 4, is constructed of sheet metal and has side walls 31, end walls 32 and a bottom 33, all welded together. Flanges 34 are formed on the upper edges of the end walls 32 and underlie the webs 22 of the longitudinal frame members 10 and 11. The said flanges are secured to the webs 22 by means of bolts 35 which extend through said flanges and webs. The tank 26 has a drain connection 36 at the lowermost portion thereof and to which a hose 37 is connected and by means of which the chemical within the tank may be drained therefrom as desired. A suitable valve, not shown, controls the flow of chemical out of the drain connection 36. In addition, the tank has, at its upper end, an overflow 38 by means of which the chemical introduced into the tank may overflow therefrom during the use of the apparatus.

The processing unit B consists of two end plates 41 and 42 which are held in space relation by means of a number of transverse rods 43, 44, 45 and 46. These rods are reduced at their ends and threaded and extend through said plates. The rod 44, at its left hand end, has screwed on it a nut 48, while the rods 43, 45 and 46 have screwed on both ends of the same, nuts 47. The rod 44 has attached to its right hand end an elongated nut 49 which is constructed with an annular groove 51. This groove co-operates with a slot 52 in the flange 23 of the frame member 10 and supports the unit B at the right hand end thereof. At the opposite end of the unit, a supporting strap 53 is employed which is attached to the end plate 42 under the nuts 47 screwed on the ends of the rods 43. These plates have attached to them two studs 54 terminating in pins 55 which are received in slots 56 formed in the flange 23 of the frame member 11. By means of this construction, the units are removably supported on the two frame members 10 and 11.

The unit B comprises four rolls 57, 58, 59 and 60 which are arranged one above the other and whose axes lie in a common, substantially vertical plane. These rolls are spaced from one another and are provided with shafts 62 which extend through and are journaled in suitable bearings formed in the end plates 41 and 42. These rolls serve as feed rolls and are driven all in the same direction to successively feed the sheets first downwardly on the left side of said rolls, as viewed in FIG. 4, about the lowermost roll 60 and then upwardly along the right hand side of the rolls. Associated with the rolls 57, 58, 59 and 60 are contact rolls 63, 64 and 65 which have shafts 66 journaled in bearings 67, which are slidably mounted in slots 68 formed in the end plates 41 and 42. The rolls 63 and 64 are mounted with their axes below the axis of the roll 57 so as to cause a sheet 70 passing said rolls to cant toward the roll 58, as shown in FIG. 4. This causes the sheet to be fed against periphery of the roll 58 inwardly of the periphery of the companion roll 63, co-operating with the roll 58. As the roll 58 rotates, the leading edge 71 of the sheet is directed outwardly and downwardly into the bight 72 between the rolls 63 and 58. The roll 68 is similarly located below the axis of the roll 57, while the rolls 65 are located a corresponding amount above the axes of the rolls 58, 59 and 60. These latter rolls cause the sheet to be correspondingly directed inwardly toward the rolls 60, 59 and 58 as the sheet is progressed upwardly and thus positively fed into the bights between the feed rolls and the companion contact rolls. It has been found that by placing the contact rolls in a manner to form an angle of approximately 3½ to 5 degrees with the horizontal plane of the feed rolls that the leading edge 71 of the paper strikes the periphery of the following feed roll at a location of about one-fourth of the radius of the feed roll inwardly from the surface of the feed roll lying in a plane tangent to all of the rolls. This position of the contacting rolls has been found to cause positive feeding of the sheets from one set of rolls to the next.

The sheet is caused to reverse from a downward direction to an upward direction by means of a reversing device 80 which consists of two arcuate guides 81 and 82 and another roll 83 mounted on a shaft 84. Shaft 84 is similarly mounted with respect to the roll 60 as the rolls 63 and 65. The axis of the roll 83 lies in the plane of the axes of the rolls 57, 58, 59 and 60 and is disposed immediately below the roll 60. The guides 81 and 82 are similar in construction and only the guide 81 will be described. This guide consists of an arcuate plate 85 which has spaced corrugations 86 extending circumferentially with respect to the periphery of the roll 60. The plate 85 has flanges 87 at the ends of the same which overlie the inner surfaces of the end plates 41 and 42 of the unit. Screws 88 extending through these flanges and screwed into the said end plates serve to hold the arcuate plates in proper position. It will be noted that the leading edges 89 of the corrugations 86 are fairly close to the periphery of roll 60 and that the said guide extends from the roll 63 and to the roll 83 with the leading edge 89 of the corrugations disposed in the bight 91 between rolls 60 and 83. As the sheet passes between rolls 63 and 60, the leading edge 71 of the sheet engages the corrugations 86 and is directed into the bight 91 where the roll 83 picks up the sheet and causes it to be fed to the guide 82. This guide, in the same manner, directs the sheet in between roll 60 and the lowermost roll 65 and from which the sheet is fed upwardly in the same manner as described in conjunction with its downward travel.

The rolls 63, 64 and 65 are urged into contact with the rolls 57, 58, 59 and 60 by means of rubber bands 90 which are anchored to the end plate 41 at their ends and which pass over sheaves 92 rotatedly mounted on the shafts 66 and 84. If desired, coil springs may be used in place of the rubber bands with the same effect.

The feed unit F, bests hown in FIG. 4, consists of two end plates 101 and 102, which are held in space relation by means of four rods 103, similar to the rods 43 and 45 which are attached to said end plates in the same manner as said rods 43 and 45. The end plates 101 and 102 support a feed roll 104 similar to the feed roll 57 which is mounted on a shaft 105 journaled in suitable bearings formed in said end plates. A pair of guide rolls 106 and 107 mounted on shafts 108 and 109 feed the sheets toward the feed roll 104. Shaft 109 is supported in bearings formed in the end plates 101 and 102 while roll 106 is mounted similarly to roll 63 for movement toward the roll 107. Two contact rolls 118 and 119, similar to the contact rolls 63, are provided which are mounted on shafts 115 and 116 journaled in the same manner as shafts 66 and are movable toward the roll 104 the same as the rolls 63. Rubber bands 144 anchored to the plate 101 and passing about sheaves 145 mounted on the shafts for rollers 106, 118 and 119 hold these rollers in contact with roller 104. Also, a guide 111, identical with either of the guides 81 or 82, is employed and which is, likewise, attached to the end plates 101 and and 102. This construction guides the sheet from the guide rolls 106 and 107 to the bight 112 between the roll 57 and its companion contact roll 63. The end plates 41 and 42 of the unit B are reduced in thickness to form flanges 113 of lesser thickness than the thickness of said plates while the end plates 101 and 102 are formed with rabbets 114 which receive the flanges 113, thus supporting the end plates in flush relation.

For transferring the film from one of the processing units B, C, and D to the next following processing unit, the transfer units G, H and I are employed. These units, being identical in construction, only the unit G will be scribed in detail. This unit is quite similar to the unit F and is shown in FIGURE 4 and comprises two end plates 121 and 122, which are held together by means of four spaced rods 123, similar to the rods 103. The unit includes a roll 127 mounted on a shaft 128 which is journaled in bearings formed in the end plates 121 and 122. Three contact rolls 131, 132 and 133, are mounted on shafts 138 which are rotatably mounted in bearings 134, slidable in slots 135 in the end plates 121 and 122. A rubber band 136 anchored to the end plate 121 passes over sheaves 137 on the shafts 138 of said rolls. In between the rolls 131 and 132 and between the rolls 132 and 133 are guides 139 similar to the guides 81 and 82. These guides and the said rolls receive the sheets leaving the rolls 57 and 64 of the unit B and direct the same upwardly and above the roll 127 and then downwardly between said roll and the roll 133. It will be noted that the roll 64 is disposed with the axis below the axis of the roll 57 so that the sheet, on leaving rolls 57 and 64, is canted toward the right, as viewed in FIG. 4, and directed against the roll 127 and into the bight 144 between the rolls 131 and 127. Similarly, the roll 133 is disposed with its axis above the axis of roll 127 so that the sheet leaving unit G is canted toward the first feed roll of unit C.

The delivery unit J is similar to the feed unit F, except that parts are reversed. The same reference numerals will hence be used to designate the identical parts. The rolls, 106 and 107, which receive the sheet from the rolls 104 and 118 and discharge the sheet from the apparatus and to dryer K are, however, not driven and freely receive the sheets therebetween.

The units G, H and I each straddle two of the units B, C, D, and E and are hence rigidly supported thereby. Unit F, however, rests only on unit B and unit J rests only on unit E. To further support these units, rods 147 are employed which are attached to the flange 23 of frame member 11 and to brackets 148 attached to the frame member 10.

The sheets leaving the processing apparatus are delivered to the drier K, which is partly shown in FIG. 5. Any suitable type of drier may be employed and, for such reason, the drier has not been shown in detail, such construction being well known in the art. The drier K utilizes spaced pairs of progressing rolls 151 and 152 which receive the sheet from the delivery rolls 106 and 107 and move the sheet through the drier. Hot air is circulated about the sheets and when the sheets reach the end of the drier, the same are sufficiently dried to be handled and disposed of.

For driving the various rolls of the various units, the transmission L is employed, which is best shown in FIGS. 1 and 2. This transmission utilizes an electric motor 161 mounted on a platform 162 suspended beneath the extensions 21 of the longitudinal frame members 10 and 11. For the purpose, the platform 162 is constructed with upwardly extending side walls 163 which have formed on them outwardly extending lateral flanges 164. These flanges underlie the webs 22 of the frame members 10 and 11 and are secured thereto by means of bolts 154. The motor 161 has built into it a worm gear speed reduction 165 which has a driven shaft 166. On this shaft is mounted a sprocket wheel 167. A chain 168 passes over this sprocket wheel and another sprocket wheel 169 fast on longitudinally extending shaft 171. Shaft 171 is disposed below the level of the lip 25 of frame member 10 and is journaled in bearings 172 secured to the web 22 of said frame member by means of screws 173. The shaft 171 has reduced ends 274 journaled in said bearings and which restrain the shaft from endwise movement. Milled into the shaft at suitable localities are worms 174. Disposed adjacent the worms 174 are spiral gears 175 which are attached to said shaft. These gears serve to drive the rolls of each of the processing units B, C, D and E and, said units being identical in construction, only the drive associated with the unit B will be described. The first of the spiral gears 175 meshes with a companion spiral gear 176 fast on a vertical extending shaft 177, best shown in FIG. 3. This shaft is journaled in bearings 170 secured to the end plate 41 of unit B. This shaft has four worms 178 on the same and which mesh with worm wheels 179 fast on the outer ends of the shafts 62 of the rolls 57, 58, 59 and 60 of said unit. By means of this construction, the rolls are all driven in the same direction and at a reduced rate of speed sufficient to procure suitable timing of the sheets as they pass through the various developing tanks.

Contact rolls 63, 83, 64 and 65 of the unit B are driven by a transmission 180, best shown in FIGURE 6. This transmission is located at the end of the unit B, adjacent to longitudinal frame member 11. The transmission 180 consists of spur gears 181 attached to the ends of the shafts 62. These spur gears mesh with spur pinions 182 on the shafts 66 of the various contact rolls and serve to drive the same. The ratio of the gears 181 and pinions 182 is the same as the ratio of the diameters of the feed rolls 57, 58, 59 and 60 and the companion contact rolls so that the contacting rolls have the same peripheral speed.

The roll 104 of unit F, and the rolls 127 of units G, H, I, and J are all driven in the same manner. Worm wheels 146 mounted on the shafts supporting said rolls mesh with the worms 174 on shaft 171.

The rolls 118 and 119 of unit F are similarly driven to the rolls 63 by means of a spur gear 183 mounted on shaft 105 and spur pinions 184 mounted on the shafts 115 and 116 of rolls 118 and 119 and which pinions mesh with the gear 183. Rolls 106 and 107 are driven in the following manner: Extending across the two end plates 101 and 102 and journaled in bearings formed therein is a drive shaft 213. This shaft has mounted on it on the end thereof adjacent end plate 102 a spur pinion 214 which meshes with spur gear 183. This pinion also meshes with a pinion 215 fast on the shaft 109 of roll 107. A similar pinion 216 on the shaft 108 of roll 106 meshes with the pinion 215. All of these pinions and the gear 183 are proportioned to give the material the same rate of speed through the unit F.

Rolls 131, 132 and 133 are all driven in a manner similar to the rolls 119 and 118 of unit F and the description of the drive therefor will not be repeated. This will, however, become apparent from FIGS. 5 and 6 of the drawings.

The entire apparatus is housed within a housing M, which consists of side walls 191, which are provided with inturned flanges 192 terminating in depending lips 193. The lips 193 are received in back of offset strips 194 attached to moulding members 195. These members consist of an upstanding part 196, a base part 197, which overlies and is secured to the flanges 25 of the longitudinal frame members 10 and 11. The upper portion of the moulding 195 is provided with a return bend 200 which terminates in a ledge 199 extending about the periphery of the moulding members 196 and forming a recess for the reception of a cover 198 removably supported thereby.

The forward portion of the apparatus consists of a table 201 which rests upon two channel frame mmebers 202 fast on the extensions 21 of the frame members 10 and 11. Mounted on the table 201 is a guide 203 which may be secured on said table at different localities and which has guide flanges 204 at the lateral marginal edges of the same. This table is of such height that it forwards the sheets resting upon said table directly into the bight 93 formed between the rolls 106 and 107. The extensions 21 of frame members 10 and 11, with attached parts, extend through a hole 211 in a wall 205 separating a dark room disposed to the left of said wall and to an illuminated room disposed to the right of said wall, as viewed in FIGS. 2 and 4. The moulding members 195 have secured to them a transverse moulding member 190 which lies flush with the wall 205. A bezel 206 overlies the wall 205 on the opposite side thereof and bolts 207 extending through said bezel, wall and moulding 196, clamp the parts together and form a light-tight connection. The walls 191 overlie and are attached to angle members 208 which are attached to the wall 205 on the outer surface of said wall. Bolts 209 extend through the bezel 206, wall 205 and angle member 208 and bolt the parts together to form a light-tight connection of the apparatus with said wall.

In the use of the invention, an operator stationed in the dark room places the films to be developed on the guide 203 with one edge of the film engaging one of the flanges 204. The sheet is then fed through the hole 211 in the wall 205 and towards the rolls 106 and 107. When the sheet is engaged by these rolls, the sheet is progressed until it reaches the bight 112 between the roll 118 and roll 104 of the feed unit F. The leading edge 71 of the sheet, upon passing through said rolls, engages the guide 111 and the corrugations of the same, the sheet is curved downwardly and bent over the roll 104. Due to the disposition of the axis of the roll 119, being above the axis of the roll 104, the sheet is canted toward the roll 57, as shown in dotted lines in FIGURE 4. As the roll 57 rotates in a counterclockwise direction, the sheet is brought into the bight 112 between rolls 63 and 57 and the end 71 of the sheet is again canted toward the roll 58. The sheet then passes into the bight 72 and, in a similar manner, is caused to successively pass the rolls 58, 59 and 60. When the sheet reaches the lowermost portion of the roll 60, guides 81 and 82 and roll 83 guide the sheet about roll 60 in the same manner as the roll 118 and guide 111. The sheet is then canted toward roll 59 and continues to travel upwardly past the rolls 59, 58, and 57. Upon passing upwardly, the sheet is carried toward the roll 127 and fed into the bight 144. The sheet then is transferred around the roll 127 and back into the tank 27. The sheet then progressively travels through the various tanks and is finally delivered by the delivery unit J to the drier K. Passing through the drier, the sheet is dried and comes out of the drier in a condition for immediate use.

While the apparatus has been described as being particularly desirable for cut film, it can be used for roll film, printing paper, cut or in the roll. The construction can also be used where leaders are attached to the film and where individual films are spliced together.

The advantages of the invention are manifest. The apparatus is extremely positive in action and has been found to operate successfully for a great number of times without misses or injury to the films. The units can be readily removed and replaced to permit of cleaning and repair when the occasion requires it, thus producing extremely good negatives without human manipulation during the developing of the same. The apparatus utilizes very little power in operation and can be built at a nominal cost.

Changes in the specific form of the invention, as herein described, may be made within the scope of what is Having described the invention, what is claimed as new and desired to be protected by Letters Patent is:

1. In photographic processing apparatus for light sensitive sheet material having a tank with parallel spaced driven feed rolls disposed therein and all rotating in the same direction, the combination of contact rolls urging the material into contact with said feed rolls inwardly of and remote from the ends of the rolls to effect a drive between said feed rolls and material, said contact rolls being parallel with said feed rolls and having their axes disposed in advance of the axes of the feed rolls with reference to the direction of travel of the material to cause the material leaving a feed roll and the companion contact roll to cant toward the following feed roll to positively direct the material into the bight between the following feed roll and the companion contact roll.

2. In photographic processing apparatus for light sensitive sheet material having a vertical developing tank, with parallel, spaced, driven, feed rolls disposed therein, one above the other and with their axes lying in a substantially common plane and all driven in the same direction, the combination of contact rolls disposed on the downwardly traveling side of said feed rolls and urging the material into contact with the feed rolls inwardly of and remote from the ends of the rolls to effect a drive between said feed rolls and material, means for feeding the material to the uppermost feed roll for downward travel, the axes of the contact rolls being parallel with the axes of the feed rolls and being disposed below the axes of the companion feed rolls to cause the material leaving a feed roll and the companion contact roll to cant toward the following feed roll to positively direct the material into the bight between the following feed roll and the companion contact roll.

3. In photographic processing apparatus for light sensitive sheet material having a vertical developing tank, with parallel spaced driven feed rolls disposed therein, one above the other and with their axes lying in a substantially common plane and all driven in the same direction, the combination of contact rolls disposed on the downwardly traveling side of said feed rolls and urging the material into contact with the feed rolls inwardly of and remote from the ends of the rolls to effect a drive between said feed rolls and material, means for feeding the material to the uppermost feed roll for downward travel, the axes of the contact rolls being parallel with the axes of the feed rolls and being disposed below the axes of the companion feed rolls to cause the material leaving a feed roll and the companion contact roll to cant toward the following feed roll to positively direct the material into the bight between the following feed roll and the companion contact roll, means to cause the material to travel below and about the lowermost feed roll and to leave the same in an upward direction, other contact rolls on the opposite sides of the feed rolls engageable with the material moved by said feed rolls and having their axes parallel with the axes of the feed rolls and disposed above the same to cause the material leaving a feed roll and its companion contact roll to cant in the opposite direction and procure positive entry in an upward direction of the material into the bight between the overlying feed roll and its companion contact roll and to procure upward movement of the material.

4. In a photographic developing apparatus for light sensitive sheet material having a developing tank with parallel spaced driven feed rolls therein all rotating in the same direction, the combination of contact rolls urging the material into contact with said feed rolls to effect a drive between said feed rolls and said material, said contact rolls being smaller in diameter than said feed rolls and being parallel with said feed rolls, said contact rolls having their axes disposed in advance of the axes of the feed rolls with reference to the direction of travel of the material to cause the material leaving a feed roll and the companion contact roll to cant toward the following feed roll to positively direct the material into the bight between the following feed roll and the companion contact roll.

5. In photographic processing apparatus for light sensitive sheet material having a vertical developing tank, with parallel spaced driven feed rolls disposed therein, one above the other and with their axes lying in a substantially common plane and all driven in the same direction, the combination of contact rolls disposed on the downwardly traveling side of said feed rolls and urging the material into contact with the feed rolls to effect a drive between said feed rolls and material, means for feeding the material to the uppermost feed roll for downward travel, the axes of the contact rolls being parallel with the axes of the feed rolls and being disposed below the axes of the companion feed rolls to cause the material leaving a feed roll and the companion contact roll to cant toward the following feed roll to positively direct the material into the bight between the following feed roll and the companion contact roll, a guide extending below the lowermost position of the lowermost feed roll and having longitudinally spaced ribs spiralling toward the feed roll in the direction of travel of the material to cause the material to travel below and about the lowermost feed roll and to leave the same in an upward direction, other contact rolls on the opposite sides of the feed rolls urging the material into contact with said feed rolls and having their axes parallel with the axes of the feed rolls and disposed above the same to cause the material leaving a feed roll and its companion contact roll to cant in the opposite direction to procure positive entry in an upward direction of the material into the bight between the overlying feed roll and its companion contact roll and to procure upward movement of the material.

6. In photographic processing apparatus for light sensitive sheet material having a vertical developing tank, with parallel, spaced, driven, feed rolls disposed therein, one above the other with their axes lying in a substantially common plane and all driven in the same direction, the combination of contact rolls disposed on the downwardly traveling side of said feed rolls and urging the material into contact with the feed rolls to effect a drive between said feed rolls and material, means for feeding the material to the uppermost feed roll for downward travel, the axes of the contact rolls being parallel with the axes of the feed rolls and being disposed below the axes of the companion feed rolls to cause the material leaving a feed roll and the companion contact roll to cant toward the following feed roll to positively direct the material into the bight between the following feed roll and the companion contact roll, a corrugated arcuate guide extending below the lowermost portion of the lowermost feed roll and spiralling toward the feed roll in the direction of travel of the material to cause the material to travel below and about the lowermost feed roll and to leave the same in an upward direction, other contact rolls on the opposite sides of the feed rolls urging the material into contact with said feed rolls and having their axes parallel with the axes of the feed rolls and disposed above the same to cause the material leaving a feed roll and its companion contact roll to cant in the opposite direction to procure positive entry in an upward direction of the material into the bight between the overlying feed roll and its companion contact roll and to procure upward movement of the material.

7. In photographic processing apparatus for light sensitive sheet material having a vertical developing tank with parallel, spaced, driven, feed rolls disposed therein, one above the other with their axes lying in a substantially common plane and all driven in the same direction, the combination of contact rolls disposed on the downwardly traveling side of said feed rolls and urging the material into contact with the feed rolls to effect a drive between said feed rolls and material, means for feeding the material to the uppermost feed roll for downward travel, the axes of the contact rolls being parallel with the axes of the feed rolls and being disposed below the axes of the companion feed rolls to cause the material leaving a feed roll and the companion contact roll to cant toward the following feed roll to positively direct the material into the bight between the following feed roll and the companion contact roll, an arcuate guide extending below the lowermost portion of the lowermost feed roll and spiralling toward the feed roll in the direction of travel of the material to cause the material to travel below and about the lowermost feed roll and to leave the same in an upward direction, other contact rolls on the opposite sides of the feed rolls urging the material into contact with said feed rolls and having their axes parallel with the axes of the feed rolls and disposed above the same to cause the material leaving a feed roll and its companion contact roll to cant in the opposite direction to procure positive entry in an upward direction of the material into the bight between the overlying feed roll and its companion contact roll and to procure upward movement of the material said guide where closest to said lowermost roll being spaced therefrom a distance greater than the thickness of the material.

8. In photographic developing apparatus for light sensitive sheet material having a developing tank with successive parallel spaced driven feed rolls therein all rotating in the same direction, the combination of successive contact rolls urging the material into contact with said feed rolls to effect a drive between said feed rolls and said material, said contact rolls being smaller in diameter than said feed rolls and being parallel with said feed rolls, said contact rolls being arranged in a manner to cause a plane tangent to the line of contact of one pair of feed and contact rolls to intersect a plane containing the axes of the following pair of feed and contact rolls at a locatility between the line of contact of the following pair of feed and contact rolls and the axis of said following feed roll.

References Cited in the file of this patent
UNITED STATES PATENTS

| | | |
|---|---|---|
| 1,809,830 | Cobb | June 16, 1931 |
| 2,492,127 | Hessert | Dec. 20, 1949 |
| 2,501,251 | Zollinger | Mar. 21, 1950 |
| 2,537,529 | Hessert et al. | Jan. 9, 1951 |
| 2,913,973 | Bull et al. | Nov. 24, 1959 |